(No Model.)

A. R. PRITCHARD.
HANDLE FOR VESSELS.

No. 548,656. Patented Oct. 29, 1895.

Witnesses:
E. H. Marsellus.
S. P. Moore

Inventor.
Albert R. Pritchard
by Howard L. Osgood
Attorney.

UNITED STATES PATENT OFFICE.

ALBERT R. PRITCHARD, OF ROCHESTER, NEW YORK.

HANDLE FOR VESSELS.

SPECIFICATION forming part of Letters Patent No. 548,656, dated October 29, 1895.

Application filed May 31, 1895. Serial No. 551,327. (No model.)

*To all whom it may concern:*

Be it known that I, ALBERT R. PRITCHARD, a citizen of the United States, and a resident of the city of Rochester, in the county of Monroe and State of New York, have invented certain new and useful Improvements in Handles for Vessels, of which the following is a specification, reference being had to the accompanying drawings, in which—

Figure 1:
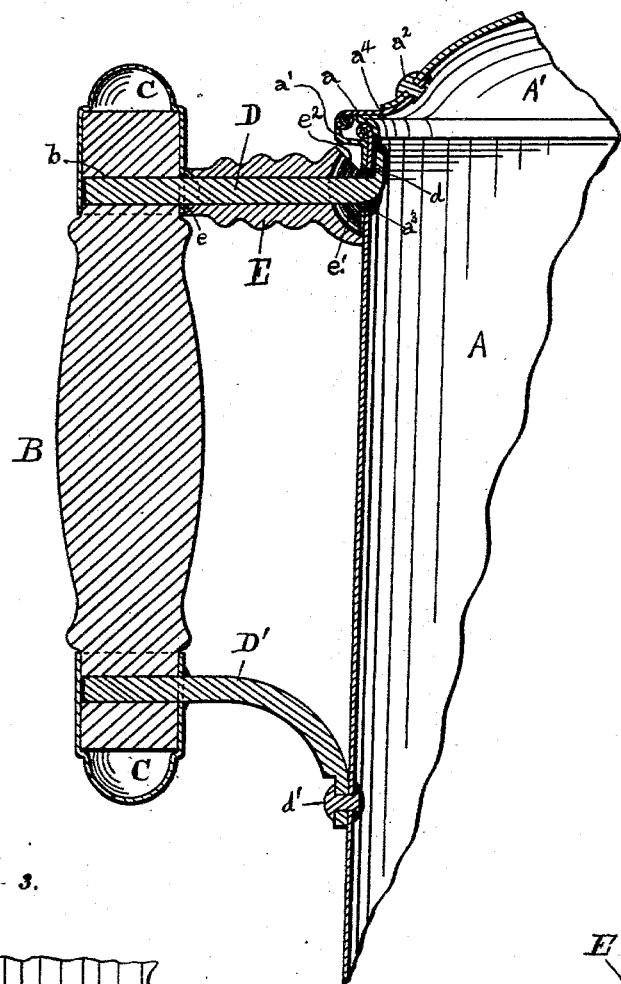
Figure 3:
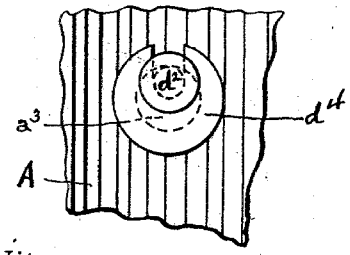
Figure 2:
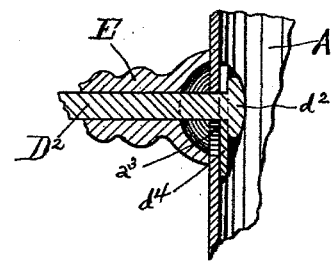

Figure 1 is a central vertical section through one of my handles and a portion of the vessel to which it is attached. Fig. 2 is a like section of a modified form of the upper fastening of one of my handles to a vessel. Fig. 3 is an elevation of the modification shown in Fig. 2, seen from the inside of the vessel.

The object of my invention is to provide a strong, cheap, and easily-constructed handle for vessels, preferably non-conducting, and particularly for such vessels as metallic teapots and coffee-pots; and it consists in the combination and arrangement of parts, hereinafter described and claimed.

In the drawings, A is the vessel to which the handle is attached.

B is a non-conducting handle proper, formed of wood or other suitable material.

C C are caps or ferrules on the ends of said handle proper B.

D D' are metallic arms, preferably formed of wire, which are the means of connecting the handle proper to the vessel.

E is a spool fitting upon the arm D and made of a non-conducting material, such as wood.

The handle proper B and the spool E are enameled or japanned over their entire surfaces with a waterproof coating. Ferrules or caps C C are next placed upon the end of the handle B and are pressed thereon, so as to fit tightly in the proper positions. Then or previously a transverse perforation or socket $b$ is made in the handle near each end and a perforation registering therewith through one side of each ferrule. These perforations are of such size as preferably to fit tightly upon the arms D D'. The upper arm D, in the form shown in Fig. 1, is made straight through the greater part of its length, and upon it is fitted the spool E, having recesses $e\ e'$ in the ends. The end $d$ of the arm D is turned upward substantially at right angles to the adjacent portion thereof, and the spool E is made shorter than the distance from the outer side of the upturned end $d$ to the ferrule C, when the arm D is fitted in its socket $b$. This permits the spool to be moved along the arm D away from the cap C. The arm D, having been properly inserted into the perforation $b$, is soldered to the cap C within the recess $e$, the spool being movable on the arm D, as above stated, to give room for this soldering. The spool is then moved up against the cap C and the recess $e$ covers the solder. An arm D' of suitable form is next fastened in the lower perforation $b$ in manner similar to that just described with reference to the arm D, although ordinarily no spool is used on this lower arm. The larger recess $e'$ in the spool E is in the larger end thereof, and the upper portion of the spool is cut away, as at $e^2$, in order to give greater range of movement of the spool upon the arm D for the soldering just described and for another purpose soon to be mentioned. The cover A' of the vessel is attached to the body A thereof by means of a hinge having two leaves $a\ a'$. The leaf $a$ is passed through a slot $a^4$ in the cover A', which fits said leaf closely, and the leaf passes from the outside of the cover into the interior thereof through the slot and is fastened at or near its end to the cover by means of a fastening, such as the rivet $a^2$. The leaf is thus firmly fastened to the cover, as it fits tightly in the slot through which it passes, and at some distance from the slot is firmly fastened by the rivet. The other leaf $a'$ is shaped to fit against the outer side of the body A and may be soldered thereto. Through the leaf $a'$ and through the body A is a perforation $a^3$, through which the upturned end $d$ of the arm D may be inserted. This is the first step in fastening the handle to the pot, and in order to perform it the arm D is tilted upward and the end $d$ is inserted through the hole, the tilting being permitted by the removal of a portion of the spool $e$, forming the inclined part $e^2$. The end $d$ being inserted the arm D is moved downward and the end $d$ rests against the inside of the body A, while the end of the spool rests against the outer side of the body A, or, if the leaf $a'$ of the hinge is made large enough, the end of the spool rests against the outside of that leaf. The spool is made of such length that when the parts are in the position shown in Fig. 1 the spool will press tightly against the outside of the body A or leaf $a'$, while the end $d$ rests close against the inside of the body and the parts are tightly clamped between the end of the spool E and the end $d$. The arm D' is now fastened to the body, as by the rivet $d'$. For additional security, the inner end of the rivet $d'$ may be covered with solder to obviate possible leakage through the rivet-hole and the perforation $a^3$, and the end $d$ may also be covered with solder, as indicated by the black portions in Fig. 1.

A modification of the fastening of the upper arm, which I have just described, is shown in Figs. 2 and 3. In this case the arm $D^2$ has an expanded head $d^2$, and the perforation $a^3$ is made just large enough to permit said head to be passed through it. The spool E' in this case has no inclined portion, such as $e^2$, Fig. 1. When the arm $D^2$ is prepared to be fastened to the handle B by soldering, &c., as described, with reference to the arm D, the spool E' is slipped away from the cap C, and the head $d^2$ rests in the recess $e^3$, thus permitting the spool to be sufficiently removed from the cap for the use of the soldering-iron or other soldering means without burning the spool. The spool is then slipped back against the cap C, the head $d^2$ is inserted through the perforation $a^3$, and the handle is pressed upward, so that the stem of the arm $D^2$ will rest against the upper side of the perforation $a^3$, while the head $d^2$ presses against the outside of the body. In some cases it is desirable to use a washer $d^4$, having a notch therein to fit upon the shank of the arm $D^2$ and to fit between the head $d^2$ and the inside of the pot, in order to cover the perforation $a^3$. Solder (indicated by the black portions in Fig. 1) may be used to fasten the parts together and also to make them tight, so that there can be no leakage through the perforation $a^3$. It is obvious, however, that in both forms shown the soldering at the fastening of the upper arm D or $D^2$ to the body A is not essential to retain the parts in place, since the leverage from the lower fastening or rivet $d'$ produces a sufficient strain through the handle B to keep a constant upward pressure at the end $d$ or head $d^2$, and thus to keep the parts in place independently of the solder. The advantage of this result is that the teapot or coffee-pot will not part from the handle, even though carelessly overheated.

The device is easily manufactured, as the handle or body may be completely and cheaply manufactured separately, and the parts are quickly and easily put together. In addition the pot, provided with its handle, can be immersed in the plating-bath without danger of the fluids obtaining access to the wood of the handle proper or spool.

It is obvious that the caps C may be omitted if the perforation or socket $b$ is made before the enameling or japanning, so that the interior of said perforation is waterproof and fits tightly upon the arm D, D', or $D^2$.

The lower arm may, if desired, be fastened to the vessel by the same means as above described for fastening the upper arm thereto.

I claim—

The combination, with a vessel body having a perforation therein of a handle proper; an arm set into a socket in said handle proper, said arm having a head or end substantially at right angles thereto and adapted to be passed through said perforation and to engage the edge thereof and against the inside of said vessel; a spool on said arm shorter than said arm and having a recess in one end thereof, and adapted to rest against the outside of said body adjacent to the perforation therein and against the handle proper; and means for connecting the other end of said handle proper to the vessel; substantially as and for the purposes described.

ALBERT R. PRITCHARD.

Witnesses:
E. H. MARSELLUS,
S. P. MOORE.